Oct. 28, 1930.  B. M. FINE  1,780,012
MACHINE FOR FORMING ARTICLES FROM SHEET MATERIALS
Filed Oct. 5, 1929  3 Sheets-Sheet 2

Inventor:
Bernard M. Fine,
By MacLeod, Calver, Copeland & Dike,
Attorneys.

Oct. 28, 1930. B. M. FINE 1,780,012
MACHINE FOR FORMING ARTICLES FROM SHEET MATERIALS
Filed Oct. 5, 1929 3 Sheets-Sheet 3
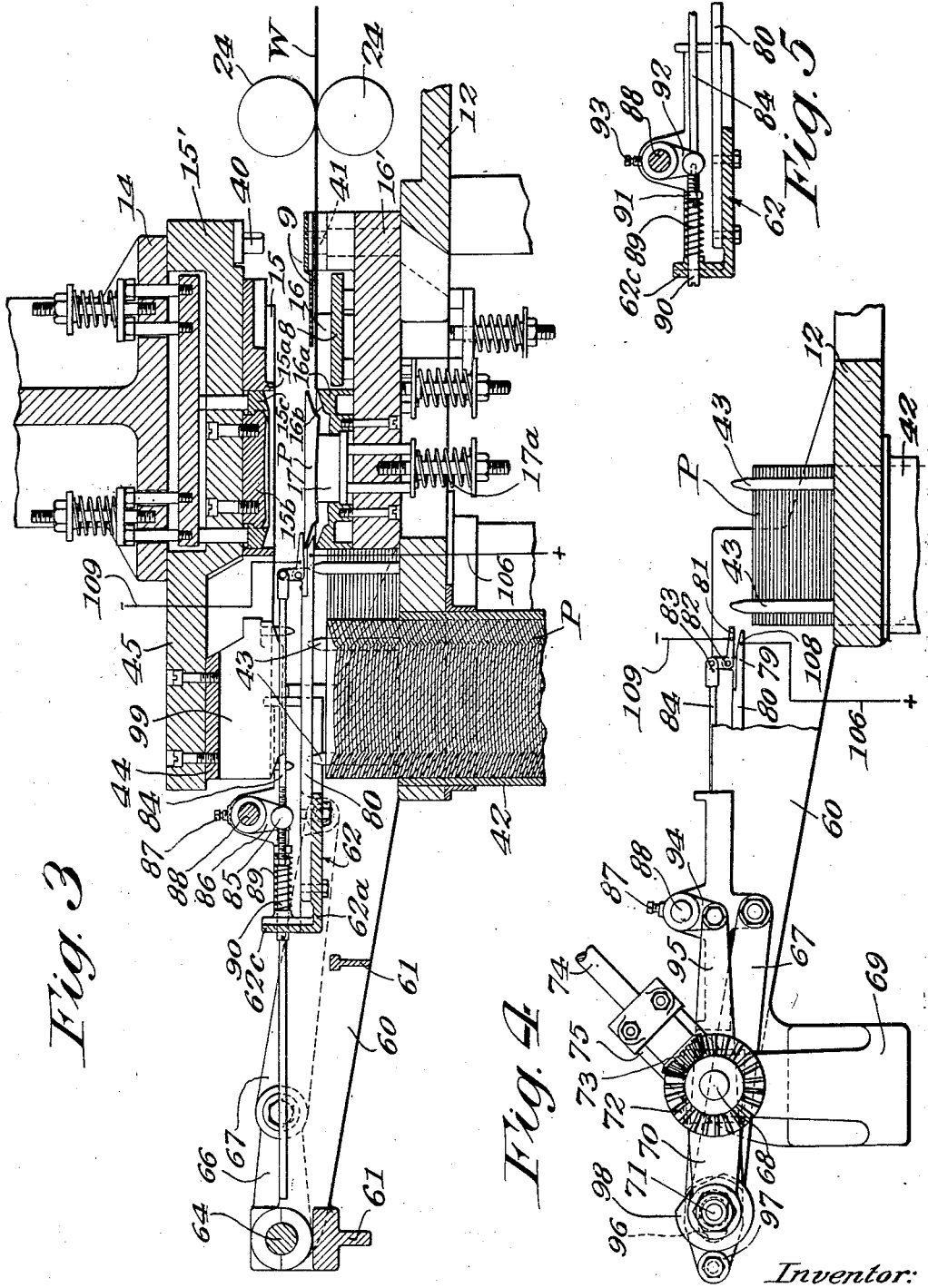

Patented Oct. 28, 1930

1,780,012

UNITED STATES PATENT OFFICE

BERNARD M. FINE, OF PHILADELPHIA, PENNSYLVANIA, ASSIGNOR TO SANITARY PRODUCTS CORPORATION OF AMERICA, OF PHILADELPHIA, PENNSYLVANIA, A CORPORATION OF VIRGINIA

MACHINE FOR FORMING ARTICLES FROM SHEET MATERIALS

Application filed October 5, 1929. Serial No. 397,560.

This invention relates to machines for forming articles from sheet material, such, for example, as machines for forming plates, dishes or the like from paper or similar stock, and has for its general and principal object to provide automatic mechanism whereby the plates or other articles, after their formation, are removed from the forming dies and stacked or nested in orderly arrangement in order to facilitate their subsequent handling and counting.

In some instances, articles of the character referred to can be formed from sheet material by a folding operation in which died-out blanks are forced through an open female die, as explained, for example, in Letters Patent No. 1,645,931, October 18, 1927. When so formed, the nesting or stacking of the completed articles can be readily accomplished by means of a stacker arranged to receive them directly from the open die through which they are forced, as more fully explained in Letters Patent No. 1,737,789, December 3, 1929. Certain types of articles, however, require for their production a die stamping or molding operation, that is to say, a direct pressure of the blanks between complementary die faces, and this necessitates the use of a female die having a closed bottom through which the completed articles cannot be directly forced into a stacker. In a machine operating on the latter principle, it is necessary to lift the completed articles from the female die and to discharge them laterally from the machine, making it difficult to nest or stack them in the desired manner. In such machines, attempts have been made to carry the completed articles along in the openings in the web from which the blanks were punched, and subsequently to discharge them into suitable stackers, as described, for example, in Letters Patent No. 1,627,412, May 3, 1927, and No. 1,695,982, December 18, 1928. This, however, leads to difficulties in the positioning of the articles in order to prevent their injury by the dies, and also necessitates the passage of the perforated web completely through the machine, whereas, as more fully explained in Letters Patent No. 1,679,655, August 7, 1928, it has been found desirable to cut apart the scrap portions of the web and dispose of them immediately after the cutting of the blanks from said web.

The present invention has, therefore, for a more particular object, the provision of mechanism for automatically transferring the articles from the stamping or molding dies to a stacker, independently of the movement of the web, and for packing the transferred articles into the stacker. Another object of the invention is to provide means for automatically stopping the machine in the event that, for any reason, the articles are not properly formed by the die members, or are not removed therefrom by the transfer mechanism. A further object of the invention is to provide improved means for cutting the web so as to dispose of the resulting scrap.

The foregoing and other objects of the invention will be clearly understood from the following description when taken in connection with the accompanying drawings, in which:

Fig. 3 is a fragmentary section of the machine taken substantially along the line 3—3 of Fig. 2.

Fig. 4 is a detail side elevation partly in section of the transfer mechanism.

Fig. 5 is an enlarged detail taken substantially along the line 5—5 of Fig. 2.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

Figure 1:
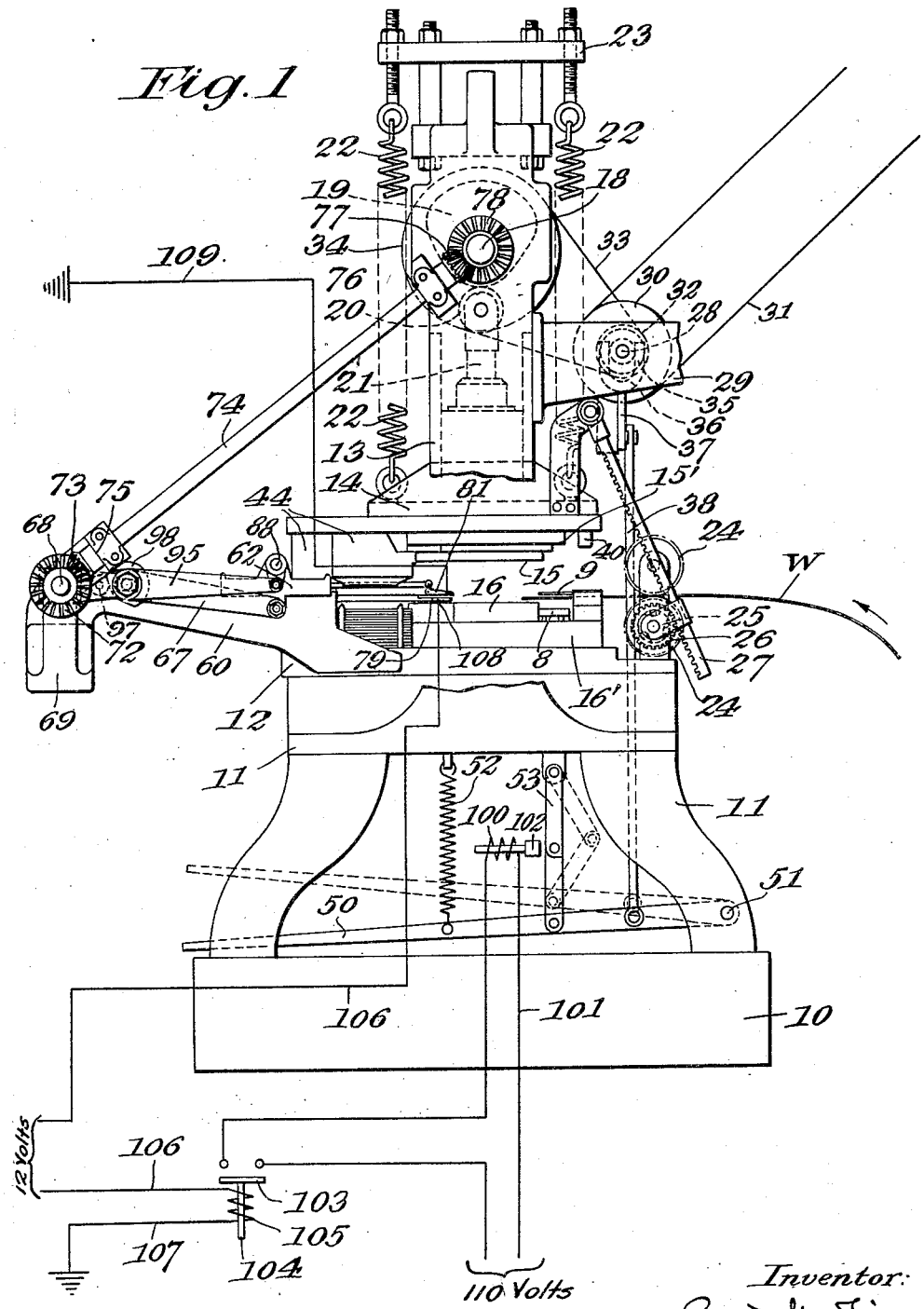
Fig. 1 is a side elevation of the machine of my invention.

Referring especially to Fig. 1, the machine or press of which this invention forms a part comprises a frame having a suitable base 10 and side uprights 11, supporting between them the bed 12 and having guides 13 for the cooperating ram 14. Complementary upper and lower combined blanking out and forming dies 15 and 16 are carried by die plates 15' and 16' secured to the ram and bed respectively. The main operating shaft 18 of the press is journalled in the uprights 11 and is provided with suitable means for reciprocating the ram 14 in the guides 13 toward and from the bed 12, said means as herein shown, comprising a cam 19 cooperating with a cam follower or roller 20 on a stem 21 projecting upwardly from the ram, said cam follower being held in engagement with said cam by springs 22 connecting the ram with a cross head 23 suitably supported from the frame side members 11 above the upper ends of the latter.

The stock, in the form of a web W of paper or other similar material, is intermittently fed, under a suitable guide 9 and over a spring-supported stripper plate or lifter 8, to and between the dies by mechanism which, as herein shown, comprises a pair of inter-geared feed rollers 24, one of which is connected by a one-way clutch 25 with a pinion 26 meshing with a rack 27 suitably connected at its upper end with the ram 14, the arrangement being such that as the ram rises away from the bed the web will be advanced, and as said ram descends toward the bed the web will remain stationary.

Suitable means are provided for applying power to the shaft 18 to rotate the same, said means as shown comprising a power shaft 28 journalled in brackets 29 carried by the frame uprights 11, said power shaft having a pulley 30 to which power from any suitable source may be transmitted through a belt 31 and a second pulley 32 connected by a belt 33 with a pulley 34 on the shaft 18. The power transmitting connections between the pulleys 30 and 32 through the shaft 28 include a clutch 35 operated by a clutch fork 36 whereby the shaft 18 may be connected with and disconnected from its source of power. The clutch fork 36 is formed on one arm of the bell crank 37, the other arm of which is connected by a rod or link 38 with a treadle or operating lever 50 suitably pivoted at 51 to the frame. The treadle 50 is normally held by a spring 52 in the elevated position shown in broken lines to cause the clutch fork 36 to release the clutch 35, thereby disconnecting the shaft 18 from its source of power and stopping the press. When depressed into the full line position the treadle 50 operates through the connections described to close the clutch 35, thereby connecting the shaft 18 with its source of power and starting the press. Said treadle may be locked in the last named position to maintain the press in operation, by a toggle 53 connecting said treadle with a suitable part of the frame.

Except as hereinafter pointed out, or as they enter into combination with mechanism hereinafter described, the parts above referred to specifically form no portion of the present invention and may be of any usual or suitable construction and arrangement.

Figure 2:
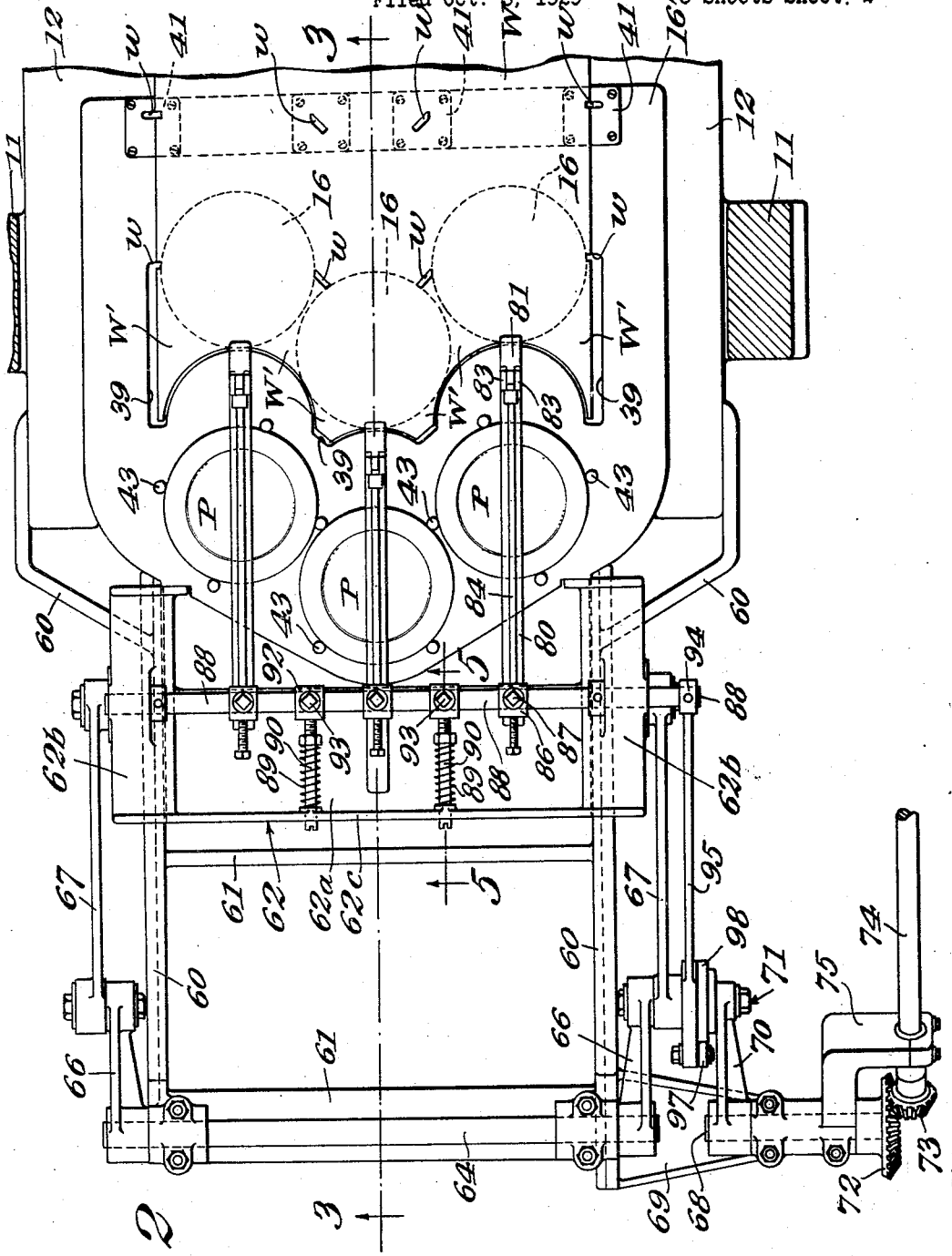
Fig. 2 is a top plan view of the lower die members and transfer mechanism.

A plurality of sets of cooperating upper and lower die members are preferably provided, said sets being arranged in staggered relation as best shown in Fig. 2. The several sets of die members (see Fig. 3) comprise female and male blanking out portions $15^a$ and $16^a$ and male and female stamping or molding portions $15^b$ and $16^b$. The blanking out portions cut blanks from the web W, which blanks are, at the same stroke of the press, formed into articles by the molding portions $15^b$ and $16^b$. Preferably, and as shown, the male molding portion $15^b$ of the upper die includes a yieldingly mounted section $15^c$ adapted, when the dies approach one another, to clamp the blank against the complementary part of the female molding portion $16^b$ of the lower die prior to the molding operation. The bottoms of the lower or female molding portions $16^b$ are provided with ejectors or lifters 17 supported by springs $17^a$ in such a manner that when the upper dies descend said ejectors are depressed into positions flush with the bottoms of the die portions $16^b$, but when said upper dies rise, said ejectors are lifted by the springs $17^a$ to lift the finished articles P out of the die portions $16^b$, as shown in Fig. 3.

The waste or scrap portions W' (Fig. 2) of the web remaining after the blanking out operation are separated and pushed downwardly through suitably arranged openings 39 in the die plate 16' and bed 12 by the blanking out portions $15^a$ of the upper die members so as to clear the dies. The separation of the scrap portions W' may, if desired, be accomplished by mechanism similar to that described in Letters Patent No. 1,679,655, above referred to. Preferably, however, and in accordance with one feature of the invention, the die plates 15' and 16' are provided with cooperating punch elements 40 and 41 (Fig. 3) adapted to perforate the web W, as shown at w in Fig. 2, at points so located, in advance of the dies, that, when the blanks are subsequently cut from said web, the remaining scrap portions W' will be left disconnected. Also, the web feeding mechanism is preferably so adjusted and proportioned that the blanks successively cut by each set of dies from the web, and the openings consequently left in the latter, will bear a substantially tangential or slightly overlapping relation to one another, thereby completely severing the web at these points.

Beyond the dies 15 and 16 are provided stackers or raceways 42 corresponding in number and arrangement to the sets of dies and adapted to receive in nested relationship the articles formed by said dies respectively, suitable mechanism hereinafter described being provided for transferring said articles from said dies to said stackers.

As herein shown, the stackers 42 are of the open or skeleton construction more fully described in application Serial No. 191,227, above referred to, and each comprises a number of strips or slats supported at their upper ends in a suitably formed opening in the bed 12 and continued above the said bed by studs 43 rising above the latter. The cross sectional form and area of each stacker corresponds substantially to the configuration and size of the articles formed, being such as to receive said articles with a frictionally engaging fit. The articles received in the several stackers are pushed downwardly therein and packed in closely nested relation by packers or plungers 44 carried by a rearwardly extending portion 45 of the upper die plate 15'.

The mechanism for transferring the completed articles from the dies to the stackers is preferably supported from the bed 12 by means of a frame comprising side members or brackets 60 projecting rearwardly from said bed and transverse members 61. The side members 60 provide ways on which is guided a reciprocating carriage 62 comprising a transverse member 62$^a$ and end members 62$^b$ suitably guided on said ways. A horizontal transverse shaft 64 is journalled adjacent its ends in suitable bearings in the side members 60 and has fixed to its opposite ends crank arms 66 connected by pitmen 67 with the carriage 62, whereby the latter is reciprocated on its guides toward and from the die members. The means for rotating the shaft 64 comprise a shaft 68 alined with said shaft 64 and journalled in a suitable bearing in a lateral extension or bracket 69 projecting from one of the side members 60. At its inner end the shaft 68 has fixed thereto a crank arm 70 spaced from the adjacent crank arm 66 and connected therewith by a crank pin 71 suitably fixed against turning in said crank arms, said crank pin serving as a connection for the corresponding pitman 67. At its outer end the shaft 68 has fast thereon a bevel gear 72 which meshes with a bevel gear 73 on an upwardly inclined shaft 74 the lower end of which is journalled in a bearing in an inclined arm 75 projecting from and preferably formed integral with the bearing portion of the bracket or extension 69. At its upper end the shaft 74 is journalled in a suitable bearing 76 carried by one of the side uprights 11 and has fast thereon a bevel pinion 77 which meshes with a bevel gear 78 fast on the shaft 18.

Carried by the carriage 62 are a plurality of article gripping devices corresponding in number and arrangement to the dies and stackers, each of said gripping devices comprising a relatively fixed jaw 79, carried by a longitudinally extending bar 80 bolted or otherwise secured to the transverse member 62$^a$ of the carriage, and a movable jaw 81 pivoted at 82 to the jaw 79 and having a pair of upstanding ears 83. Pivoted between the ears 83 of each movable jaw 81 is the forward end of a rod or link 84, the rear end of which is in threaded engagement with a block 85 pivotally carried by the free end of an arm 86 secured, as by a set screw 87, to a transverse shaft 88 journalled at its ends in suitable bearings carried by the end members 62$^b$ of the carriage 62. It will be seen that oscillation of the shaft 88 will operate, through the arms 86 and rods 84, to open and close the jaws of the several article gripping devices. The shaft 88 is rocked in a counter-clockwise direction, as viewed in Figs. 3 and 4, to close the jaws of the several gripping devices by means of springs 89 carried by rods 90 guided at their rear ends for longitudinal movement in an upstanding flange 62$^c$ on the transverse member 62$^a$ of the carriage 62, said springs being interposed between said flange and nuts 91 on said rods. At their forward ends, the rods 90 engage arms 92 suitably secured, as by set screws 93, to the shaft 88. For the purpose of rocking the shaft 88 in a clockwise direction to open the jaws of the gripping devices, said shaft has fast thereon at one end an arm 94 to which is pivotally connected a link 95 having adjacent its rear end a slot 96 to receive the crank pin 71, whereby said link is guided on said crank pin. At its extreme rear end the link 95 carries a roller 97 which cooperates with a cam 98 fast on said crank pin. It will be seen that, as the coaxial shafts 64 and 68 rotate, the crank pin 71 will revolve about the common axis of said shafts and will itself be rotated upon its own axis, thereby rotating the cam 98 once during each rotation of said shafts and reciprocating the link 95 with respect to the carriage 62, as the latter is itself reciprocated.

In operation, as the ram 14 rises after the forming operation of the dies, the ejectors 17 operate to lift the completed articles P from the lower or female forming dies 16$^b$, as above explained. At the same time, the carriage 62 is moved forwardly to cause the jaws 79 and 81 of the several gripping devices to embrace the edges of the plates so lifted. As the carriage reaches the forward limit of its movement, the high portion of the cam 98 engages the cam roller 97 and causes the rock shaft 88 to be rocked in a clockwise direction, thereby closing said jaws upon said edges. Thereupon, the carriage 62 moves rearwardly, carrying the articles into positions over the stackers 42. As said carriage reaches the rearward limit of its movement, the low portion of the cam 98 is brought opposite the cam roller 97, permitting the springs 89 to rock the shaft 88 in a counter-clockwise direction, thereby opening the jaws and permitting the articles to drop into the stackers. As the ram 14 descends, carrying with it the packers or plungers 44, the latter serve to press the articles into closely nested relation in the stackers, as above described.

Inasmuch as the several mechanisms above described for reciprocating the ram 14 and for operating the carriage 62 are such as to produce relatively synchronized but continuous harmonic movements of said parts, the packers 44 are preferably formed at their lower sides with slots or recesses 99 to receive the respective work gripping mechanisms so as to permit said mechanisms, as well as said packers, to operate without interference with one another.

In accordance with another feature of the invention, mechanism is provided for automatically stopping the machine in the event of failure of the web to be properly fed to the dies or of the failure of the dies to produce properly formed articles. This mechanism, as illustrated, comprises a solenoid which is positioned adjacent the toggle 53 and has its windings 100 connected in an electric circuit 101 of relatively high potential, such as 110-volt line. A plunger 102 enclosed by the windings 100 is arranged to be operated by the solenoid, when the latter is energized, to break the toggle. A contact making relay is provided in the circuit 101, the movable auxiliary contact member 103 of said relay being actuated by a solenoid plunger 104 surrounded by windings 105 connected in an electric circuit of relative low potential, such as 12-volt line, said circuit including conductors 106 and 107, the latter being grounded to the frame. The conductor 106 is connected with insulated contacts 108 carried by the relatively fixed jaws 79 of the several article gripping devices, said insulated contacts cooperating with the corresponding relatively movable jaws 81, which latter are grounded to the frame as indicated at 109.

The arrangement is such that when the jaws are closed upon one another the jaw 81 tends to engage the contact 108 to close the circuit 106 and 107. Normally, when said jaws are closed upon the edge of an article, as above described, the presence of said article prevents engagement of the jaw 81 with the contact 108. Should, however, the machine in any way fail to function in its intended manner, so that no article is presented to the jaws of any of the gripping devices when said jaws are closed, the circuit 106 and 107 will be closed to energize the solenoid 105, thereby closing the circuit 101 to energize the solenoid 100 and causing the plunger 102 to break the toggle 53 and stop the machine.

I claim:

1. In a machine having relatively movable die members for die stamping and forming articles from sheet material, in combination, means for feeding a sheet of material to the die members, a stacker for formed articles, mechanism for transferring the articles from the dies to the stacker, and a packer for forcing the transferred articles into the stacker.

2. In a machine having relatively movable die members for die stamping and forming articles from sheet material, in combination, means for feeding a sheet of material to the die members, a stacker for formed articles, mechanism for transferring the articles from the dies to the stacker, and a packer for forcing the transferred articles into the stacker, said packer being recessed to receive said transferring mechanism.

3. In a machine having relatively movable upper and lower sets of die members for die stamping and forming articles from sheet material, in combination, mechanism for reciprocating the upper die member, means for feeding a sheet of material into position between the upper and lower die members, a stacker for the formed articles, means for lifting formed articles from the lower die member, automatic transfer mechanism for transferring the formed articles from the dies to said stacker, and means moving with said upper die member for packing the transferred articles into the stacker.

4. In a machine having relatively movable die members for die stamping and forming articles from sheet material, in combination, means for feeding sheet material between said members, mechanism for relatively moving said members toward and away from each other, automatic means for removing articles from the forming dies, means for starting and stopping said mechanism, and means for automatically actuating said last named means to stop the machine including means normally maintained inoperative by the articles but adapted to be actuated by the failure of said articles to be in position to be engaged by said removing means.

5. In a machine having relatively movable die members for die stamping and forming articles from sheet material, in combination, means for feeding sheet material between said die members, mechanism for relatively moving said members toward and away from each other, a stacker for the formed articles, automatic means for gripping and transferring said articles from the dies to the stacker, means for starting and stopping said mechanism, and a circuit closing device maintained inoperative when the articles are engaged by said gripping and transferring means but rendered operative to stop the machine upon the failure of the gripping means to engage an article.

6. A machine for forming articles from sheet material comprising, in combination, relatively movable upper and lower die members for die stamping and forming said articles, means for feeding sheet material between said die members, mechanism for relatively moving the die members toward and away from each other, a stacking device associated with said die members, and mechanism for transferring formed articles from the dies to the stacking device, said transferring mechanism comprising a movable carriage having article gripping members and means for reciprocating the carriage and actuating the grippers, said die moving mechanism and said transferring mechanism being synchronized, whereby an article is transferred from the dies to a stacker between successive downward strokes of the upper die member.

7. A machine for forming articles from sheet material comprising, in combination, relatively movable upper and lower die members for die stamping and forming said articles, means for feeding sheet material between said die members, mechanism for relatively moving the die members toward and away from each other, a stacking device associated with said die members, grippers for engaging and removing the formed articles, and mechanism for moving and operating the grippers to cause them to close upon the formed articles in the dies, transfer the same from the dies to the stackers, and thereafter release the same.

8. A machine for forming articles from sheet material comprising, in combination, relatively movable upper and lower die members for die stamping and forming said articles, means for feeding sheet material between said die members, mechanism for relatively moving the die members toward and away from each other, a stacking device, and mechanism for transferring formed articles from the dies to the stacking device, said mechanism comprising a rotary shaft having one or more crank arms operated thereby, a movable carriage connected with and reciprocated by said crank arms, a rock shaft in said carriage, article grippers operated by said rock shaft, a cam rigidly carried by one of said crank arms, and means operated by said cam for oscillating said rock shaft to actuate the grippers at predetermined times to grip and transfer formed articles from the dies to the stacking device.

9. In a machine having relatively movable die members for blanking out and forming articles from sheet material, in combination, means for feeding a web of sheet material to the die members, means for separating from the body of the web the scrap portions thereof remaining after the blanking out operation, a stacker for formed articles, and mechanism for transferring the articles from the dies to the stacker.

10. In a machine having relatively movable die members for blanking out and forming articles from sheet material, the combination with means for feeding a web of sheet material to the die members, of means, operating in advance of said die members, for punching holes in said web adjacent the openings therein subsequently formed by the blanking out operation to separate the scrap portions of the web from the body thereof.

11. In a machine having relatively movable die members for blanking out and forming articles from sheet material, in combination, means for feeding a web of sheet material to the die members, means, operating in advance of said die members, for punching holes in said web at points adjacent the openings therein subsequently formed by the blanking out operation, a stacker for formed articles, and mechanism for transferring the articles from the dies to the stacker.

In testimony whereof I affix my signature.

BERNARD M. FINE.